April 26, 1927.  V. YNGVE  1,626,173
DRY CELL
Filed Jan. 25, 1924
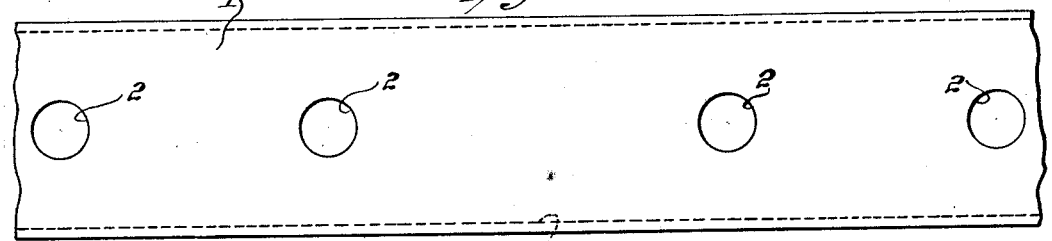
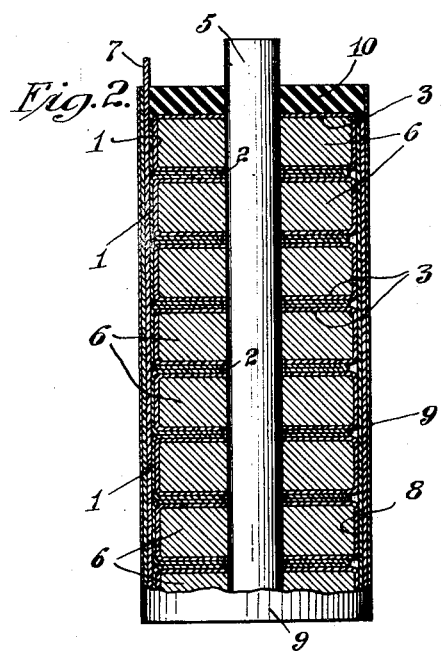
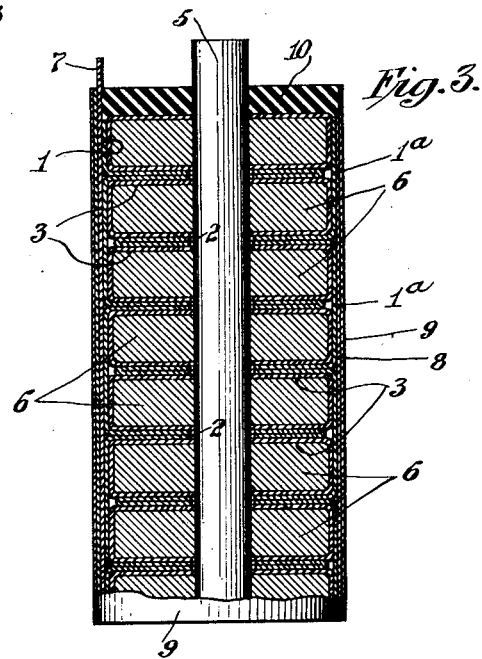
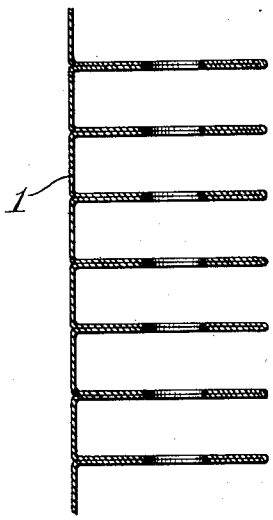
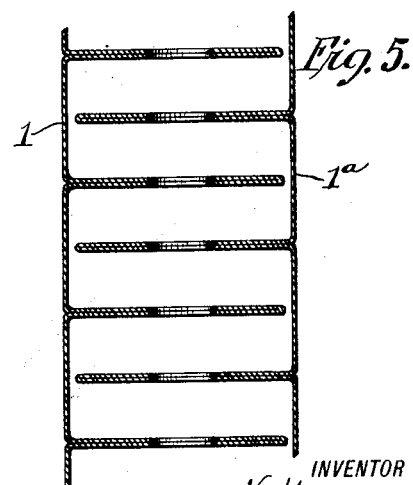
INVENTOR
V. Yngve
BY
his ATTORNEY Patented Apr. 26, 1927.

1,626,173

UNITED STATES PATENT OFFICE.

VICTOR YNGVE, OF SOUTH ORANGE, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY CELL.

Application filed January 25, 1924. Serial No. 688,424.

This invention relates to dry cells and more particularly to improvements in the construction and arrangement of zinc electrodes.

When a dry cell is discharged it ceases to function properly long before the active ingredients are consumed. For example, zinc and manganese dioxide remain in sufficient amounts to give much longer service after the cell has been practically discharged. This is due to the high internal resistance that develops in the cell.

It has been suggested to overcome this defect by changing the shape and size of the electrodes and by bringing them closer together. However, all these changes were to be effected at a relatively great expense.

It is the object of the present invention to provide a structure inexpensive to construct and efficient in operation and in which a relatively large zinc surface is exposed to the action of the electrolyte.

The nature of the invention will be more clearly understood from the following description of some embodiments thereof and the appended claims.

In the drawings, Fig. 1 shows a fraction of the zinc electrode used in the construction of my improved dry cell; Figs. 2 and 3 are vertical cross-sections of two types of dry cells constructed in accordance with the present invention; and Figs. 4 and 5 are cross sections of the zinc electrodes as used in the cells shown in Figs. 2 and 3, respectively.

Referring now to the drawings, 1 is a strip of zinc of relatively light gauge provided with a plurality of perforations 2. The perforations are spaced in pairs at a certain distance from each other, whereby when the zinc 1 is bent in to the shape illustrated in Fig. 2, a carbon electrode 5 may be inserted through the perforations and the plurality of superimposed pockets. The perforations 2 are large enough to permit the passage of carbon 5 without contacting with the zinc.

Before the carbon electrode is inserted through the perforations, a plurality of rectangular washers or tablets 6, compacted of a suitable depolarizing mixture, are placed within the pockets formed by the zinc electrode. These tablets are of substantially the same type as the ones described in a co-pending application of W. F. Hendry, Serial No. 654,611, filed July 30, 1923, with the exception that they are rectangular in shape. The perforations in these tablets are in line with the perforations in the zinc electrodes and are of somewhat smaller diameter than the perforations 2 and are just of sufficient width firmly to hold electrode 5. Before the washers 6 are inserted in place, they are wrapped in paper 3 for the purpose of separating the depolarizing material from the zinc electrode. Small holes in alignment with the perforation through the washer are provided in the top and bottom of the paper wrapper. A strip of zinc 7 is soldered to the zinc plate and serves as a terminal. Preferably, the zinc strip 7 is soldered or otherwise connected with the electrode 1 at a plurality of points throughout its lengths, insuring thus a connection with parts of the cell that might otherwise be severed due to breaks in the continuity of zinc electrode 1. The whole assembly is placed within a cardboard box 8 which may be surrounded by a second wrapper 9 and sealed at 10.

In the construction illustrated in Fig. 3, two strips of zinc 1 and 1ª are used, two perforations 2 being skipped in each strip. The two strips 1 and 1ª are bent to form alternate pockets for the washers 6, whereby a structure will be obtained in which two zinc electrodes may be connected in parallel.

Obviously, further modifications may be effected without departing from the spirit of the present invention.

It will be noted that in my improved dry cell the zinc electrode 1, forming the side walls of the pockets, is exposed to the mix 6 and electrolyte contained therein throughout its length, and a large number of times (in the present case fourteen) the width of the cell. Therefore, the battery will continue to function as long as there are active ingredients, no matter where located in the mix. The mix usually dries out the fastest around its outside surface and the resulting increase in the internal resistance of the cell will prevent its further use. Inasmuch as in the present case the zinc is exposed to a plurality of layers of the mix throughout its widths, paths of lesser resistance will be found by the current, insuring the continued usefulness of the cell. These advantages are secured without rendering the cell too expensive or otherwise impractical. The use of washers eliminates the necessity of tamping the cell, a highly impractical and wellnigh impossible operation with zinc and carbon electrodes of the type herein disclosed. Furthermore, the mix does not entirely surround the anode and thus the danger of breakage on account of corrosion is materially reduced.

The washers 6 may be wrapped in paper by means of automatic machinery, whereby the construction of the cell is rendered simpler and therefore less expensive. Instead of wrapping the washers in paper, one side of the zinc electrode may be covered with paper or the like, which will serve to separate the mix from the anode. The casing 8 may be of some suitable bibulous material holding the electrolyte which is fed into the interior of the cell through the paper 3.

What I claim is:

1. The method of forming a dry cell which comprises forming a plurality of perforated tablets of depolarizing mix, perforating a strip with perforations arranged in pairs longitudinally thereof, bending said strip into a member of comb shaped cross sections with the holes in alignment, placing the tablets with their holes in line with the holes in said electrode and inserting a carbon electrode through said aligned holes.

2. In a dry cell, a carbon electrode, tablets compacted of depolarizing mix surrounding said electrode, and a zinc electrode shaped to be exposed to said tablets parallel with said carbon electrode and to form pockets within which said tablets are located.

3. In a dry cell, a zinc electrode formed of an integral sheet into a plurality of pockets all opening in the same direction, a tablet of depolarizing mix filling each pocket, and a carbon electrode traversing said pockets.

4. In a dry cell, a zinc electrode bent into shape to form a plurality of pockets, a tablet compacted of depolarizing mix in each pocket, a wrapper of cellulose material around each washer, perforations through said zinc, paper and washers, and a carbon electrode projecting through said perforations.

5. In a dry cell, a plurality of tablets compacted of depolarizing mix, two zinc electrodes bent to form alternate walls separating said tablets from each other, and a carbon electrode projecting through said walls and tablets.

In witness whereof, I hereunto subscribe my name this 23rd day of January, 1924.

VICTOR YNGVE.